(12) United States Patent
Hsu et al.

(10) Patent No.: US 7,898,319 B2
(45) Date of Patent: Mar. 1, 2011

(54) EFFICIENCY IMPROVEMENT IN CHARGE PUMP SYSTEM FOR LOW POWER APPLICATION

(75) Inventors: Jenshou Hsu, Hsin-Chu (TW); Tah-Kang Joseph Ting, Hsinchu (TW)

(73) Assignee: Etron Technology, Inc., Hsin-Chu (TW)

( * ) Notice: Subject to any disclaimer, the term of this patent is extended or adjusted under 35 U.S.C. 154(b) by 0 days.

(21) Appl. No.: 11/005,171

(22) Filed: Dec. 6, 2004

(65) Prior Publication Data

US 2006/0119417 A1 Jun. 8, 2006

(51) Int. Cl.
G05F 1/10 (2006.01)
G05F 3/02 (2006.01)

(52) U.S. Cl. .......................................... 327/536
(58) Field of Classification Search .......... 327/535–537; 363/59–60

See application file for complete search history.

(56) References Cited

U.S. PATENT DOCUMENTS

| | | | | |
|---|---|---|---|---|
| 5,426,334 A * | 6/1995 | Skovmand | | 327/427 |
| 5,912,560 A * | 6/1999 | Pasternak | | 324/536 |
| 6,128,242 A * | 10/2000 | Banba et al. | | 365/226 |
| 6,275,096 B1 * | 8/2001 | Hsu et al. | | 327/535 |
| 6,429,725 B1 * | 8/2002 | Tanzawa et al. | | 327/536 |
| 6,456,153 B2 * | 9/2002 | Buck et al. | | 327/536 |
| 6,469,571 B2 | 10/2002 | Esterl et al. | | 327/536 |
| 6,535,052 B2 | 3/2003 | Myono | | 327/536 |
| 6,570,434 B1 | 5/2003 | Hsu et al. | | 327/536 |
| 6,765,428 B2 * | 7/2004 | Kim et al. | | 327/534 |
| 6,791,212 B2 * | 9/2004 | Pulvirenti et al. | | 307/113 |
| 6,798,274 B2 * | 9/2004 | Tanimoto | | 327/536 |
| 2004/0239408 A1 * | 12/2004 | Chen et al. | | 327/536 |
| 2005/0047181 A1 * | 3/2005 | Yamamoto et al. | | 363/60 |

* cited by examiner

*Primary Examiner* — Quan Tra
(74) *Attorney, Agent, or Firm* — Saile Ackerman LLC; Stephen B. Ackerman (57) ABSTRACT

A method and apparatus are provided for improving the efficiency in charge pump systems for low power applications. This first embodiment provides a method and apparatus which defines a charge pump output voltage high target which turns off a charge pump enable signal and a charge pump outlet voltage low target which turns on a charge pump enable signal. A second embodiment defines a protection time where the charge pumping continues until a predefined phase is completed and the leakage paths are disabled. A third embodiment defines a phase memory block, which continues or remembers the phase until the next request for charge pumping. This prevents the circuitry from entering a window where charge leakage, which diminishes charge pumping efficiency, could occur.

32 Claims, 8 Drawing Sheets

EFFICIENCY IMPROVEMENT IN CHARGE PUMP SYSTEM FOR LOW POWER APPLICATION

BACKGROUND OF THE INVENTION

1. Field of the Invention

The present invention generally relates to charge pumping circuitry. More particularly, this invention relates to a method and apparatus for improving the efficiency in charge pump systems for low power applications.

2. Description of the Prior Art

Figure 1A:
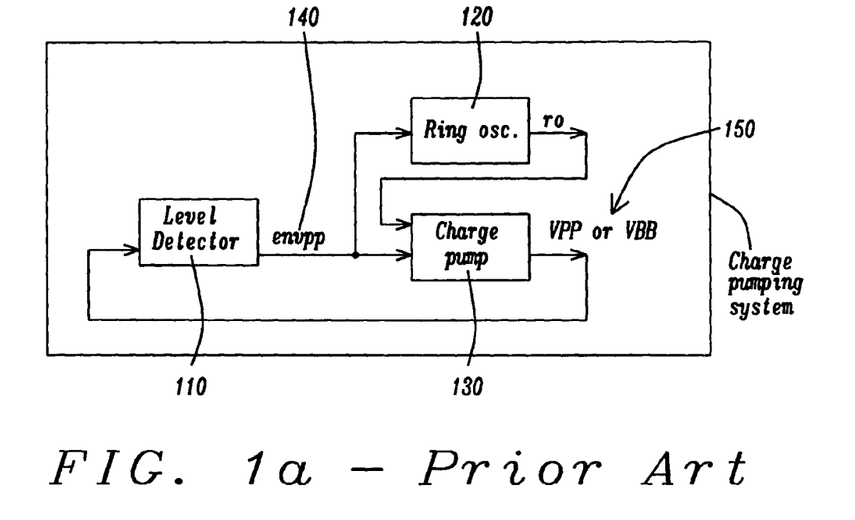
FIG. 1a is a prior art charge pumping system block diagram.

The major components of low power charge pumping system are shown in FIG. 1a. The components are a level detector 110, a ring oscillator 120, and a charge pump 130. When the charge pump 130 drives the output voltage, VPP, 150 above the target voltage, the level detector 110 would disable both the charge pump 130 and ring oscillator 120 to save power. The power dissipation of the circuit driven by the charge pump circuit, which drives node VPP, is consumed during normal operation. When the VPP voltage drops below the target level, the level detector 110 would enable the ring oscillator 120 and the charge pump circuit 130. Once again, the charge pumping system would restart to drive the VPP node until its voltage level goes above the target level again.

Figure 1B:
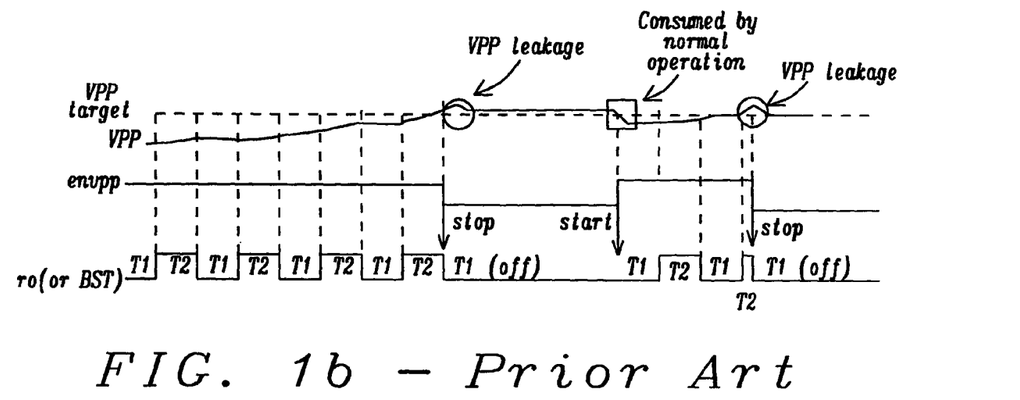
FIG. 1b shows a prior art charge pumping system timing diagram.

FIG. 1b shows a timing diagram of the operation of the charge pumping system of FIG. 1a. As shown in FIG. 1b, when VPP's level is below the target level, the signal ENVPP, which is driven by the level detector goes high. When ENVPP goes high the ring oscillator and charge pump are activated. When VPP is driven to a level, which is above the target level, the ENVPP signal goes low. When ENVPP goes low, the charge pumping system would disable the pumping process in whatever phase (T1 or T2) the charge pumping circuit is in, and the charge pump would go into T1 (off) state directly. A VPP leakage path would occur, if the charge pump stops in the middle of the phase T2 cycle.

Figure 2A:
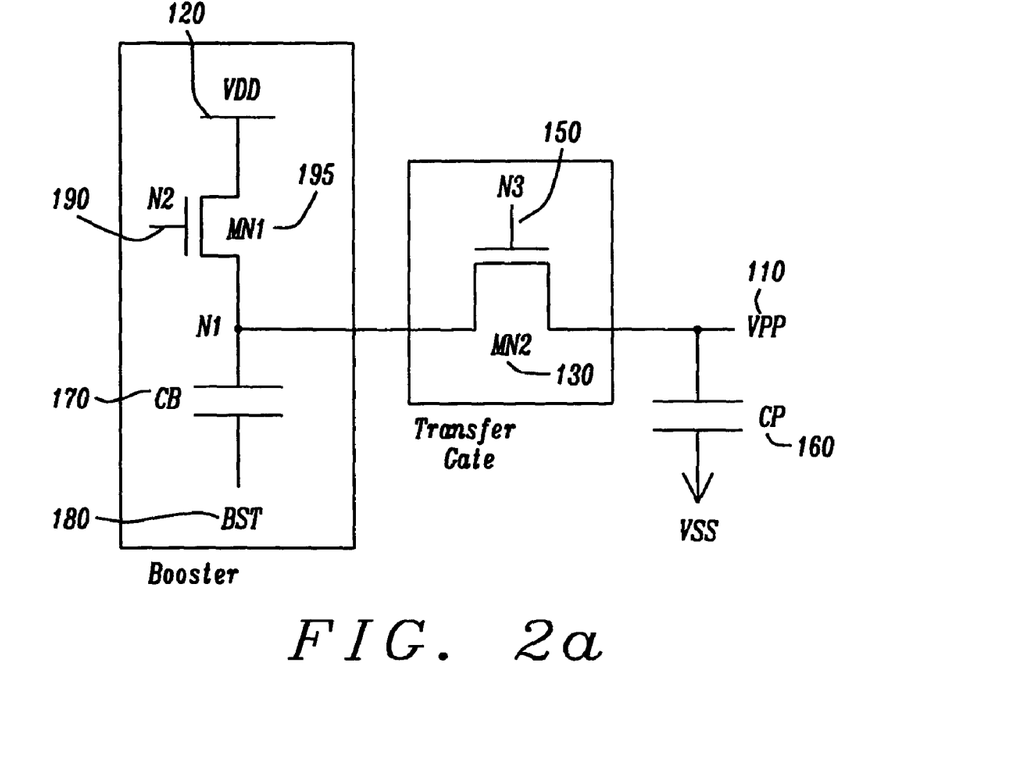
FIG. 2a shows a prior art device level charge pump circuit.
Figure 2B:
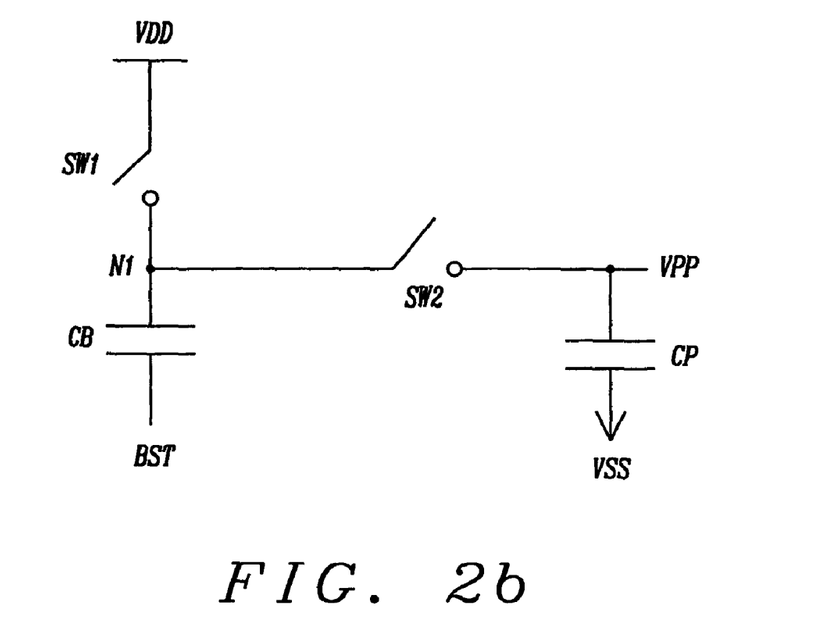
FIG. 2b shows a prior art switch level charge pump circuit.
Figure 2C:
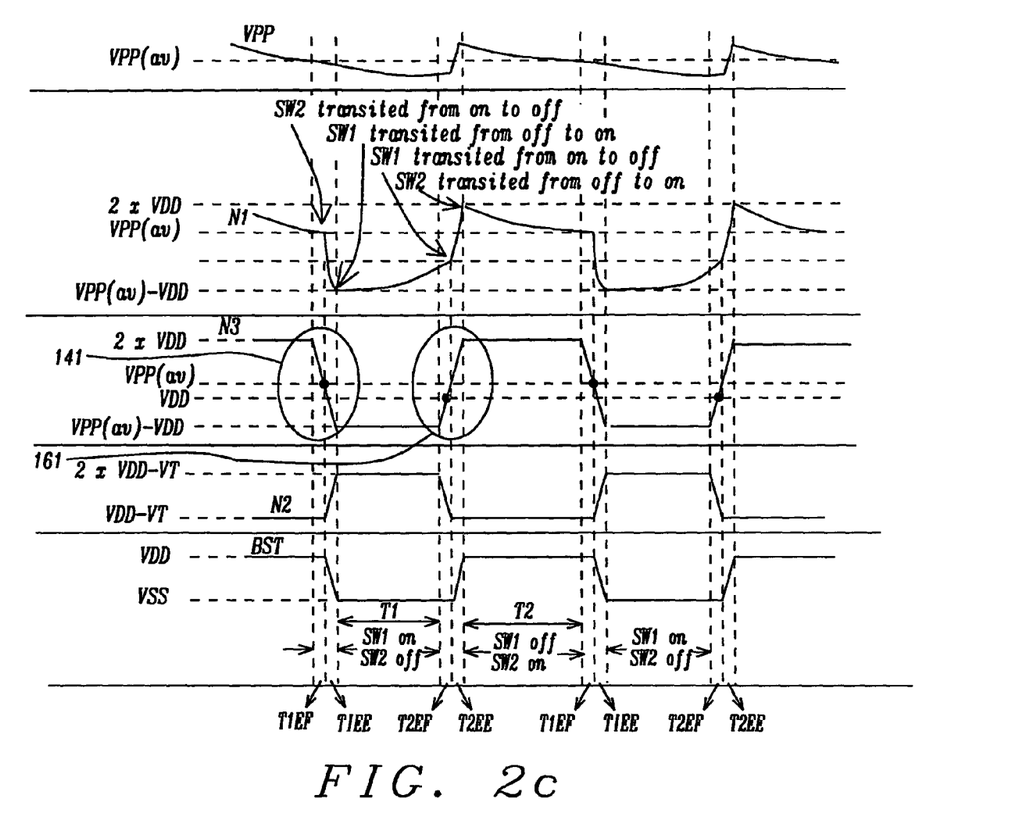
FIG. 2c shows a more detailed prior art charge pumping system timing diagram.

FIG. 2a is a device level description of the leakage path, while FIG. 2b illustrates the same leakage path using switches instead of devices. FIG. 2a has device MN1 representing the switch SW1 shown in FIG. 2b. Also, FIG. 2a has device MN2 representing the switch SW2 shown in FIG. 2b. This leakage path occurs for the following reason. During phase T2 as shown in FIGS. 2a, 2b and 2c, switch SW2 is ON and node N3 stays in a higher voltage (>VPP). If we force the charge pump circuit to go back into phase T1 at the midpoint of phase T2, the BST (booster) and N3 nodes would transit to a low level simultaneously. This would produce a leakage path during this phase transition window as shown in FIG. 3. Before BST transits to VSS low level, SW2 is not turned OFF first. Therefore, during the BST transition, a VPP leakage would be generated from node VPP to Node N1 through SW2. This VPP leakage path would occur frequently whenever the level detector stops the charge pump operation as shown in FIG. 1b. A worst case may occur as in FIG. 2d.

Figure 2D:
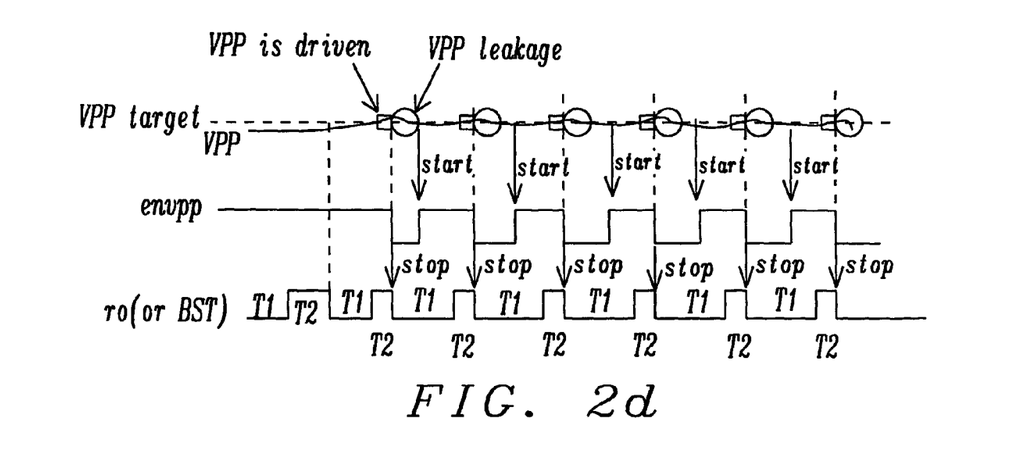
FIG. 2d shows a worst case prior art charge pumping system timing diagram.
Figure 3:
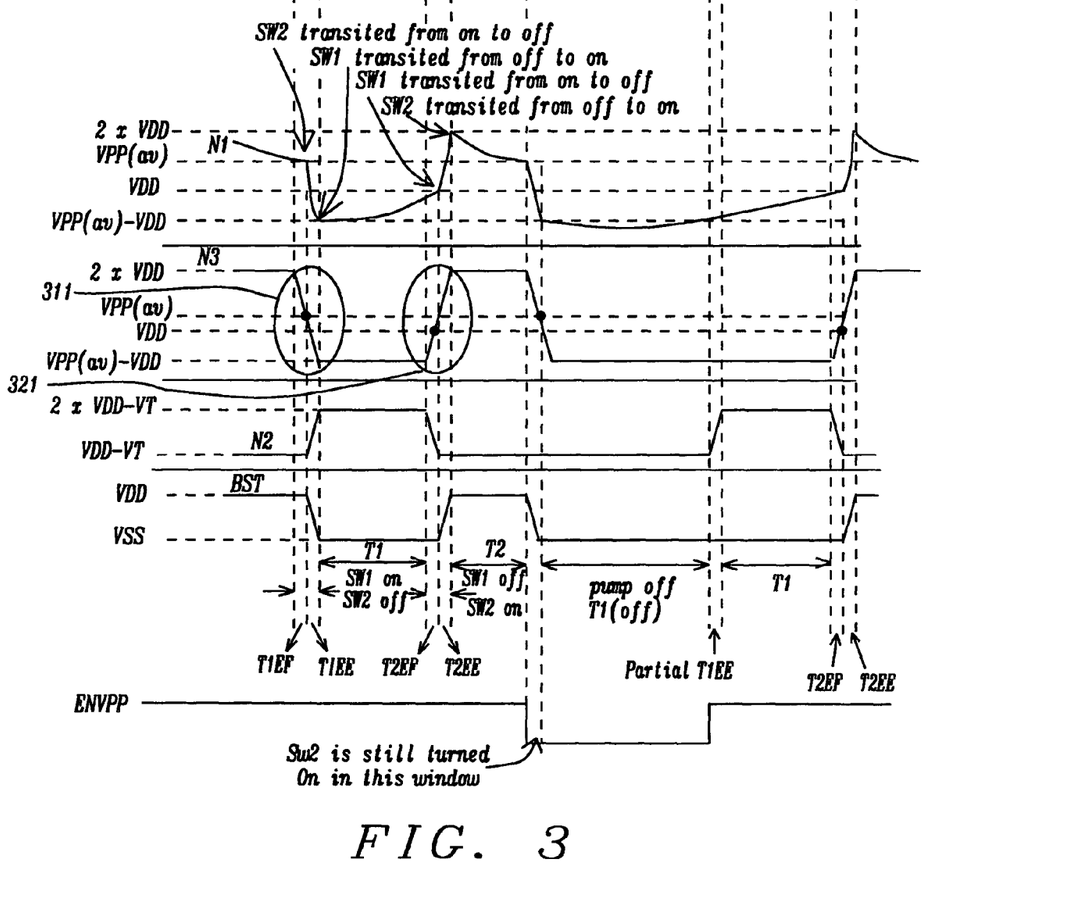
FIG. 3 shows another more detailed prior art charge pumping system timing diagram.

FIG. 2d shows that when VPP is a small amount below the VPP target level, the signal ENVPP would start the charge pump. When the charge pump operates at first T2 cycle, the VPP level would be boosted to above the VPP target and the level detector would disable the charge pump at midway of the T2 cycle. This stop action would enable some VPP power leakage to occur. This would drop the VPP level to a little below the VPP target level. Then, the level detector would restart the pump process again. This repeated changing of phases greatly increases the opportunity for leakage current. Therefore, the efficiency of the whole pumping system would be degraded severely.

U.S. Pat. No. 6,570,434 (Hsu, et al.) describes a dynamic clamp which is used in conjunction with capacitors with thinner dielectric or with deep trench capacitors to solve the problem of dielectric breakdown in high stress capacitors. The dynamic clamp is built using a two stage pump operation cycle such that, during a first stage pump cycle, a middle node of a pair of series connected capacitors is pre-charged to a supply voltage and, during a second stage pump cycle, the middle node is coupled by a boost clock. Thus, at any moment in the pump operation cycle, the voltage across the capacitors is held within a safety range.

U.S. Pat. No. 6,535,052 (Myono) discloses a charge pump circuit of the Dickson type, which circuit is characterized by dock drivers CD1 and CD2 for supplying clock pulses to coupling capacitors C1-C3. In other words, it is arranged in such a manner that the rising time and falling time of the dock pulses CLK and CLKB are extended to the extent that the outputs from the dock drivers CD1 and CD2 will not cause resonance.

U.S. Pat. No. 6,469,571 (Esterl, et al.) describes a charge pump which has two inputs, an input dock signal and an output for the output of a pumped output potential. Two pumping capacitors are connected to the inputs. Second electrodes of the pumping capacitors are in each case connected via a first circuit module to a supply potential (ground) and via a second circuit module to the output. In addition, there is a controllable short-circuiting element, the controllable path of which is disposed between the second electrodes of the two pumping capacitors.

SUMMARY OF THE INVENTION

It is therefore an object of the present invention to provide a method and an apparatus for improving the efficiency of charge pumping systems in low power applications.

The objects of this invention are achieved by identifying leakage current which occurs during charge pumping action, defining a charge pump output voltage high target, defining a charge pump outlet voltage low target, defining a charge pump enable signal which activates a charge pumping, action, and defining a charge pump output voltage. The method specifies if the charge pump voltage goes below the specified charge pump output voltage low target, the charge pump enable signal activates. The method also specifies if the charge pump voltage goes above the specified charge pump output voltage high target, the charge pump enable signal deactivates. The method controls the charge pump efficiency by varying the charge pump output voltage high target and the charge pump output voltage low target.

The above and other objects, features and advantages of the present invention will be better understood from the following detailed description taken in conjunction with the accompanying drawings.

DESCRIPTION OF THE PREFERRED EMBODIMENT

Different charge pumping circuit designs have different pumping efficiency. For example, a 25% pumping efficiency means that we need 4 units of external power (ie. VDD) to get 1 unit of pumped power (ie. VPP). It is very important to improve charge pumping efficiency for low power circuit design. The objective of the embodiments of this invention is to reduce leakage current which will reduce external VDD power consumed. This in turn will increase charge pumping efficiency.

As previously presented above, FIG. 2a shows a basic charge pumping circuit. FIG. 2a shows a Metal Oxide Semiconductor Field Effect Transistor (MOSFET) charge pump. N-channel MOSFET device MN1 (195) has its drain attached to the VDD (120) power supply, its gate attached to signal N2 (190) and its source attached to node N1 and to one node of capacitor CB (170). The other node of CB is attached to a booster signal, BST (180). N-channel device MN2 (130) has its drain attached to node N1, its gate attached to signal N3 (150) and its source attached to the charge pump output VPP (110). One side of capacitor CP, is attached to VPP and the other node of CP (160) is attached to VSS. The simplified diagram of this charge pump is drawn in FIG. 2b switches SW1 and SW2 replace devices MN1 and MN2.

FIG. 2c shows the transition from phase T2 to phase T1. It shows the node N3 voltage falling 141. This node has two slopes which cross at the Vpp(av) level shown. FIG. 2c also shows the transition from phase T1 to phase T2. It shows the node N3 voltage rising 161. This rising voltage 161 has two slopes which cross at the VDD level.

FIG. 3 identifies six phases of operation which explain the charge pumping and VPP leakage mechanisms at work in this invention. An explanation of the 6 phases follows. If the charge pumping process is stopped, the pumping circuit would go back to phase T1 and stay on phase T1 and force N2 to stays low. The internal voltage levels of charge pump (ex. N1, N3) during T1 are smaller than those of during T2 except N2, so there is less device reliability problem during T1. Therefore when the charge pump is stopped, we prefer it to stay T1 and force N2 to stay low. Therefore generally the time of inactivated charge pump in much longer than that of activated charge pump in the application, waveforms are current-some of following description may not be completely clear. If we want to restart the pumping process, the pumping circuit would start from phase T1 (off) and force N2 to high first, then partial T1EE (T1-T2EF-T2EE-T2-T1EF-T1EE-T1 and so on). If so, refer to waveforms.

The first phase, T1EF, is when N3 transits from 2×VDD to VPP (av) 311. SW2 turns off at end of T1EF, N2 stays VDD-VT, SW1 stays turned off, BST stays VDD, and N1 stays VPP (av).

The second phase, T1EE, is when N3 transits from VPP (av) to VPP (av)-VDD. SW2 stays turning off, N2 transits from VDD-VT to 2×VDD-VT, SW1 turns on at end of $2^{nd}$ phase; BST transits from VDD to VSS, and N1 is coupled from VPP (av) down to VPP(av)-VDD.

The third phase, T1, is when N3 stays VPP (av)-VDD, SW2 stays turned off, N2 stays 2×VDD-VT, SW1 stays turned on, BST stays VSS, and N1 is precharged from VPP(av)-VDD to VDD by through SW1.

The fourth phase, T2EF, is when N3 transits from VPP (av)-VDD to VDD 321, SW2 stays turning off, N2 transits from 2×VDD-VT to VDD-VT, SW1 turns off at end of phase, BST stays VSS, N1 is stops precharging, and N1 stays at VDD.

The fifth phase, T2EE, is when N3 transits from VDD to 2×VDD, SW2 at end turns on, N2 stays VDD-VT, SW1 stays turning off, BST transits from VSS to VDD, and N1 is boosted from VDD to 2×VDD.

The sixth phase, T2, is when N3 stays 2×VDD, SW2 stays turning on, N2 stays VDD-VT, SW1 stays turning off BST stays VDD, and N1 is discharged from 2×VDD to VPP(av) by through SW2.

During T2, there would be a charge sharing between node N1 and VPP, i.e., the charge stored on capacitor CB would drift to capacitor CP until both CB's voltage level and CP's voltage level are equal to VPP(av). (Capacitor CP>>Capacitor CB due to loading).

During the first 5 phases, the circuit always consumes VDD, (either during transitions of all signals, or during precharge, ie. during $3^{rd}$ phase T1), due to current flow through MN1 to charge up CB. During $6^{th}$ phase, VDD is not consumed since just transferring charge from CB to CP.

$$\text{Efficiency} = \frac{\overset{(\text{occurs during } 6^{th} \text{ phase})}{\text{Gross } VPP \text{ driven}} - \overset{(\text{occurs during the stopping of charge pumping action at T2 phase without protection})}{VPP \text{ leakage}}}{\underset{(\text{occurs during } 1^{st} 5 \text{ phases})}{VDD \text{ consumed}}}$$

$$\text{Efficiency} = \frac{\text{Net } VPP \text{ driven}}{VDD \text{ consumed}}$$

By using the first embodiment, the opportunity of VPP leakage would be reduced (see FIG. 4d), and the average VPP leakage current of the first embodiment would be smaller than that of the prior art. The net VPP current driven of the first embodiment would be larger than that of the prior art. Thus, the pump efficiency of the first embodiment would be higher than that of the prior art. By using the second embodiment or the third embodiment, there is no VPP leakage current during the pumping action. Thus, the pump efficiency of the second or the third embodiment is higher than that of the prior art.

Figure 4A:
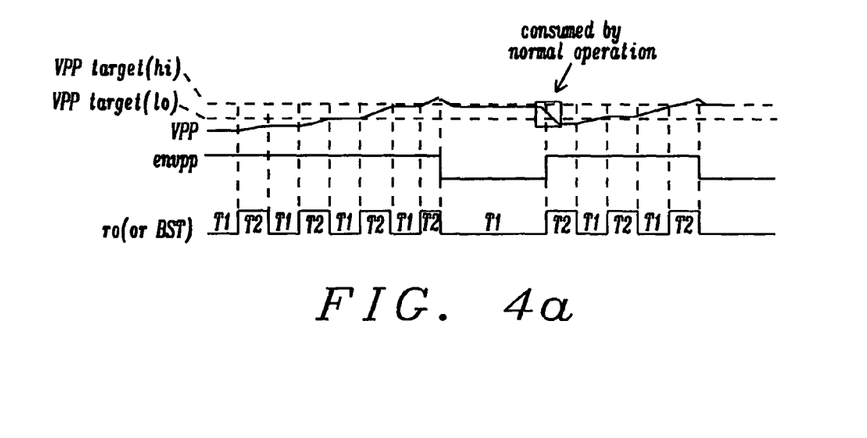
FIG. 4a shows a timing diagram for the first embodiment of this invention.

FIG. 4a shows a timing diagram of the first embodiment of this invention. FIG. 4a avoids the worst current leakage condition of FIG. 2d. FIG. 4a shows two VPP targets being defined. There is a VPP target (hi) and a VPP target (low). The ENVPP signal does not go High until the VPP level drops below the VPP target (Low) level. Once the ENVPP signal goes High, it will not go low until the VPP level is boosted above the VPP target (Hi) level as shown in FIG. 4a. Therefore, the VPP pumping system does not activate until the VPP signal drops below the VPP target (Low) level. But once the pumping system is activated, it would not stop until VPP is larger than VPP target (Hi). The percentage of leakage VPP current during the stopping of the T2 phase versus the pumped VPP current can be controlled to a small value by the first embodiment of this invention. Besides this scheme can save the warm up power (1$^{st}$ 5 phases) of the pumping circuit and the power of the last T2 phase. Therefore the last T2's phase N1 charge is not completely transferred to VPP. The leakage problem occurs when the ENVPP signal falls. In this first embodiment, the frequency of the falling of ENVPP is less than in the prior art, which is shown in FIG. 4d.

Figure 4B:
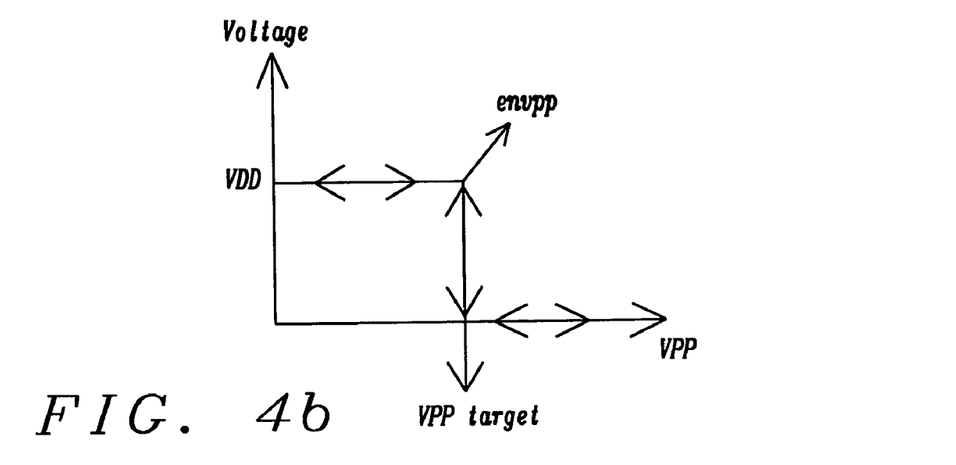
FIG. 4b illustrates the prior art transition of the charge pump enable signal.
Figure 4C:
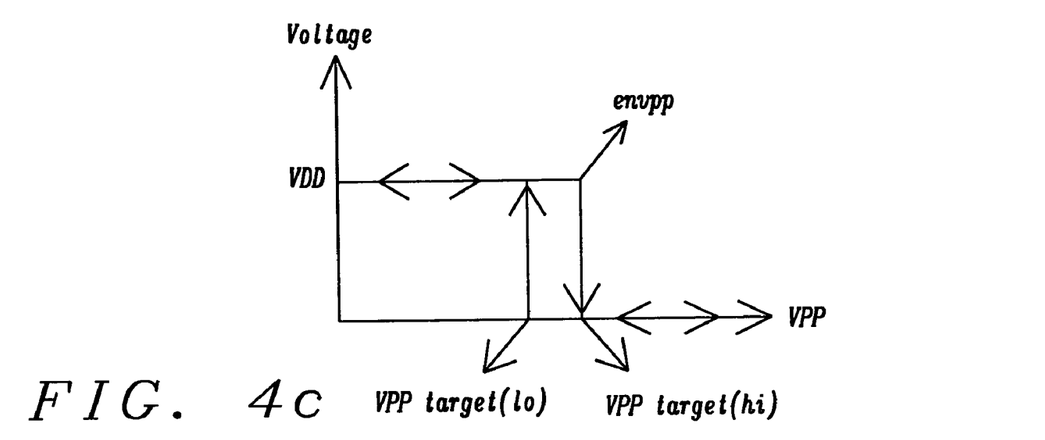
FIG. 4c illustrates the first embodiment of this invention transition of the charge pump enable signal.
Figure 4D:
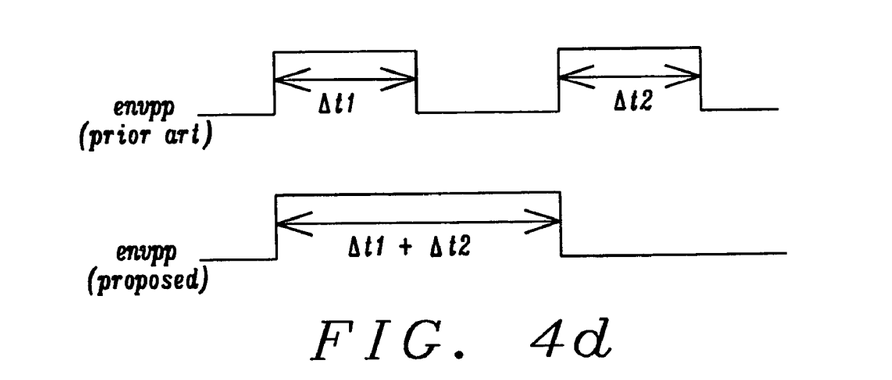
FIG. 4d shows a comparison of the charge pump enable signal in the prior art versus the first embodiment of this invention.

FIG. 4b shows how the ENVPP signal goes both high and low at the prior art Vpp target level. FIG. 4c shows how the ENVPP signal goes high at the Vpp target(low) voltage and goes low at the Vpp target (high) level. This aspect of the first embodiment results in the waveform of FIG. 4d where in the prior art the ENVPP signal would go active, inactive, then active again. Whereas the proposed embodiment 1, maintains ENVPP active throughout due to the settings of Vpp target (low) and Vpp target (high).

Figure 5A:
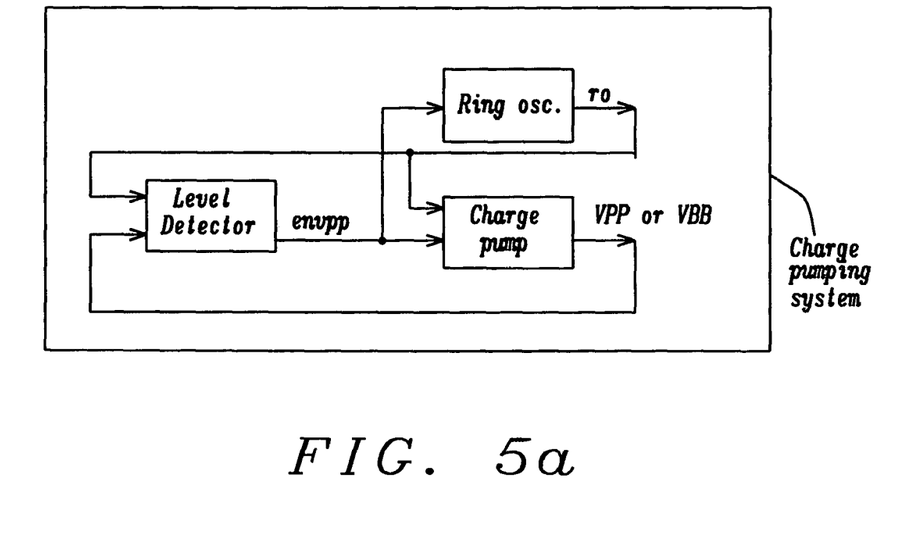
FIG. 5a shows a block diagram for the second embodiment of this invention.
Figure 5B:
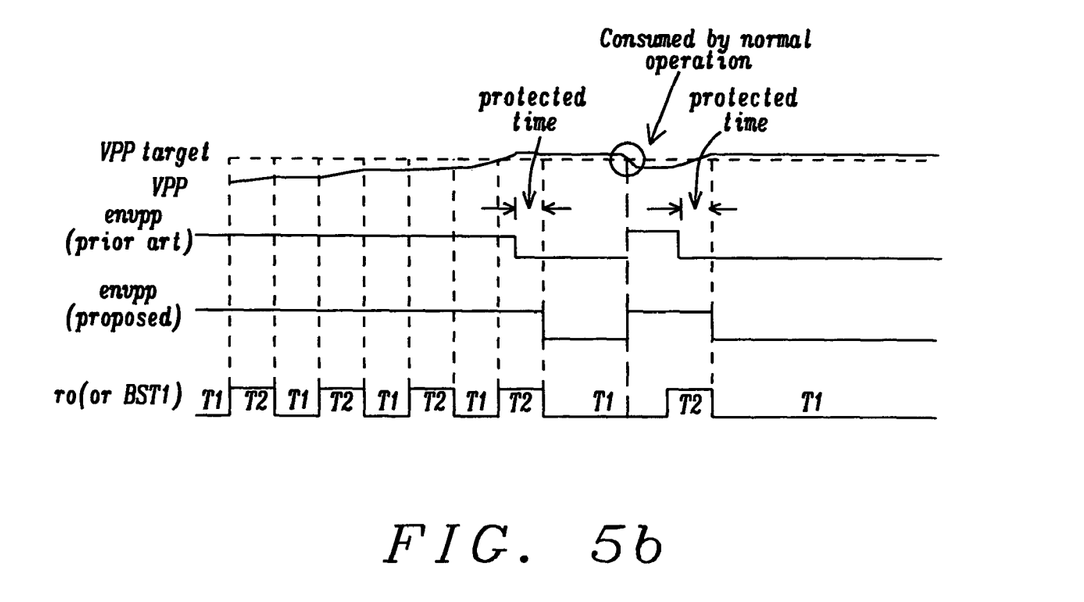
FIG. 5b shows a timing diagram for the second embodiment of this invention.
Figure 5C:
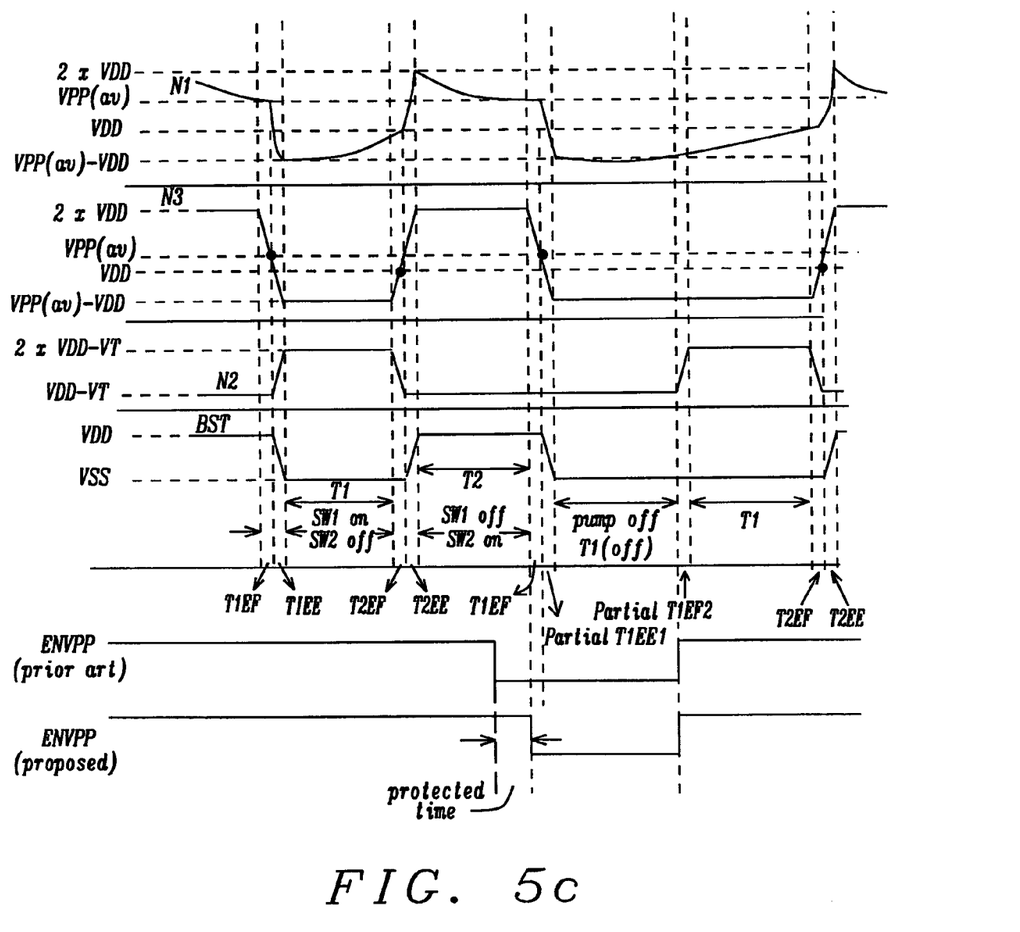
FIG. 5c shows a more detailed timing diagram for the second embodiment of this invention.

FIGS. 5a, 5b, and 5c shows the second embodiment of this invention. A protection time idea is included in this embodiment as shown in FIG. 5b and FIG. 5c. Whenever the Vpp level is boosted above the VPP target level, the pumping action does not stop until the phases T2, T1EF and partial T1EE1 are completed as shown in FIG. 5c. But during the partial T1EE1 phase, node N2 is not coupled to high as in the normal phase T1EE shown in FIG. 5c. The extension of pumping time is designed to protect the VPP leakage when phases T2, T1EF and partial T1EE1 are not executed completely. Therefore, there is no VPP leakage problem in the whole operation of the pumping system. The pumping efficiency of the whole system can be optimized using this second embodiment of the invention.

As can be seen from FIG. 5c, during the normal T1EE phase, N2 transits from VDD-VT to 2×VDD-VT. N3 transits from VPP(av) to VPP (av)-VDD and BST transits from VDD to VSS. In addition, FIG. 5c shows that during the partial T1EE1 phase, node N2 stays at VDD-VT, node N3 transits from VPP(av) to VPP(av)-VDD, and node BST transits from VDD to VSS. FIG. 5c also shows that during T1 (off) phase, node N2 stays at VDD-VT, node N3 stays at VPP(av)-VDD, node BST stays at VSS and that during normal T1 phase, node N2 stays at 2×VDD-VT, node N3 stays at VPP(av)-VDD, node BST stays at VSS. FIG. 5c also shows that during the partial T1EE2 phase, node N2 transits from VDD-VT to 2×VDD-VT, node N3 stays at VPP(av)-VDD, and node BST stays at VSS. This second embodiment has two advantages. It avoids VPP leakage, and it completely transfers the boosted charge on capacitor CB to capacitor CP.

Figure 6A:
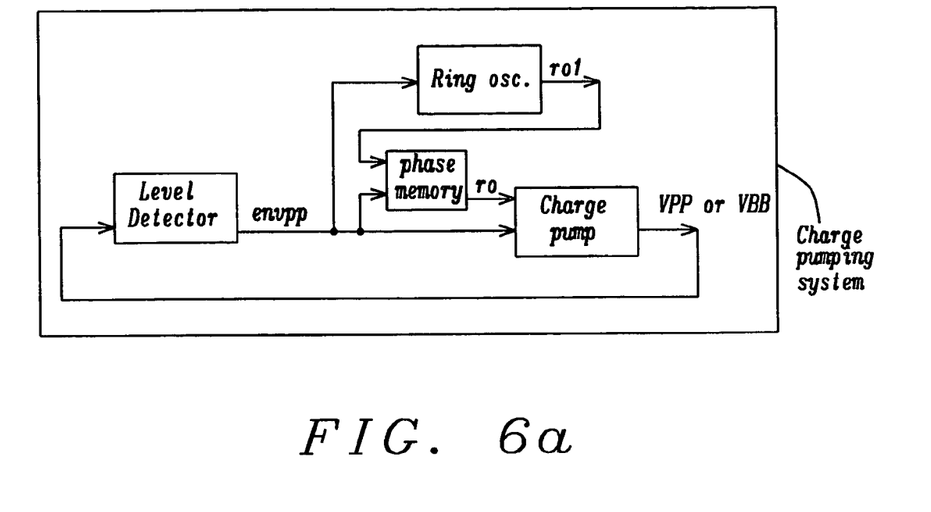
FIG. 6a shows a block diagram for the third embodiment of this invention.
Figure 6B:
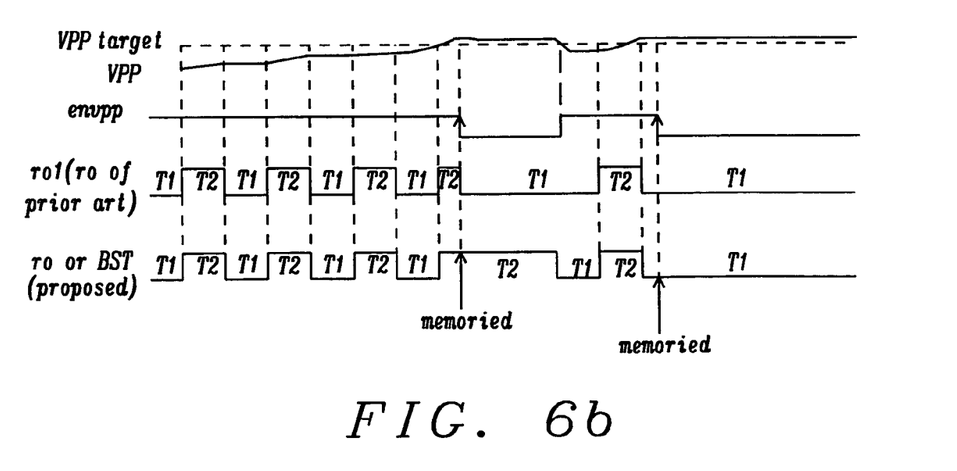
FIG. 6b shows a timing diagram for the third embodiment of this invention.

FIGS. 6a and 6b show the third embodiment of this invention. The purpose of the block diagram of FIG. 6a is to avoid the leakage problem. As shown in FIG. 6a, a phase memory block is added to the similar block diagram of prior art FIG. 1a. Whenever VPP level is boosted to above VPP target level, the level detector would stop both the charge pump and ring oscillator immediately as in the prior art, but the charge pump's phase, which is encountered at the stopping time would not be lost and not be transited to phase T1(off), as shown in FIG. 6b. The "memoried" phase would not be changed until the next pumping action is executed as shown in FIG. 6b. Therefore, there is no VPP leakage problem, which occurs during the stopping time of the charge pump circuit. The efficiency of the whole pumping system would be improved when the charge pump circuit is stopped. Generally the stay time of the stopped charge pump is much longer than that of activated charge pump in the application. This scheme has a drawback, because the charge pump may stay in phase T2. The internal voltage of the charge pump circuit may stay at a higher voltage when the charge pump stops at phase T2. Device reliability may become a concern, due to the oxide stress at the MN1 and MN2 devices shown in FIG. 2a. If oxide reliability is not a problem, this third embodiment of the invention is a very good solution to the VPP leakage problem.

The advantage of the first embodiment of this invention is the ability to control the efficiency of the charge pumping system by adjusting the target high and target low voltages via the level detecting circuitry to limit and control the amount of leakage current. The advantage of the second embodiment is that due to the protected time shown in FIG. 5b, there is no VPP leakage problem in the operation of the pumping system. The advantage of the third embodiment is that it is possible to completely eliminate the leakage current by controlling the phases of the charging pumping operation. There is no leakage during the stopping time for the third embodiment. However, embodiment 3 requires that the devices stay in a higher more stressful voltage state for an extended period. However, if the devices can handle the voltage, the 3$^{rd}$ embodiment offers an excellent solution to the charge pump efficiency problem.

While the invention has been described in terms of the preferred embodiments, those skilled in the art will recognize that various changes in form and details may be made without departing from the spirit and scope of the invention.

What is claimed is:

1. A method for efficiency improvement in charge pump systems for low power applications comprising the steps of:
   providing a level detector which drives a charge pump and a ring oscillator,
   providing said ring oscillator which drives said charge pump,
   providing said charge pump which drives said level detector, with a charge pumping action,
   identifying leakage current which occurs during a charge pumping action,
   wherein said leakage current results in a leakage power,
   providing a charge pump output voltage high target which is detected by said level detector,
   providing a charge pump output voltage low target which is detected by said level detector,
   providing a charge pump enable signal which activates said charge pumping action, and
   identifying a charge pump output voltage,
   wherein charge pump output power minus said leakage power divided by a charge pump consumed power results from said charge pumping action, is defined as a charge pump efficiency,
   wherein said charge pump efficiency is varied and controlled by varying said charge pump output voltage high target,
   wherein said charge pump efficiency is varied and controlled by varying said charge pump output voltage low target,
   wherein changing said charge pump output voltage high target and said charge pump output voltage low target allows said charge pump to minimize a phase when said leakage current occurs.

2. The method for efficiency improvement in charge pump systems of claim 1 wherein if said charge pump voltage goes below said charge pump output voltage low target, said charge pump enable signal activates.

3. The method for efficiency improvement in charge pump systems of claim 1 wherein if said charge pump voltage goes above said charge pump output voltage high target, said charge pump enable signal deactivates.

4. A method for efficiency improvement in charge pump systems for low power applications comprising the steps of:
providing a level detector which drives a charge pump and a ring oscillator,
providing said ring oscillator which drives said charge pump and said level detector,
providing said charge pump which drives said level detector, with a charge pumping action,
identifying a consumed current which occurs during said charge pumping action,
identifying a charge pump output voltage,
identifying leakage current which occurs during a charge pumping action, wherein said leakage current results in a leakage power,
providing a charge pump enable signal which activates charge pumping action,
providing a charge pump output voltage target which is detected by said level detector,
providing a phase T2 cycle where a leakage current does not occur,
providing a phase leakage current T1EF cycle wherein said leakage current does not occur, and
providing defining a phase leakage current partial T1EE1 cycle wherein said leakage current does not occur
wherein said leakage current is disabled during a protection time which includes entire charge pumping phases T2, T1EF, and partial T1EE1,
wherein said protection time allows that additional circuitry beyond said level detector, said ring oscillator, and said charge pump is not required to minimize or eliminate said leakage current,
wherein charge pump output power minus said leakage power divided by a charge pump consumed power results from said charge pumping action, is defined as a charge pump efficiency,
wherein said charge pump efficiency is varied and controlled by varying said charge pump output voltage target.

5. The method for efficiency improvement in charge pump systems of claim 4 wherein said charge pump enable signal remains active until said phase T2 cycle, said phase T1EF cycle and said phase partial T1EE1 cycle are completely executed, wherein said leakage current does not occur.

6. The method for efficiency improvement in charge pump systems of claim 4 wherein said charge pump enable signal remains active causing an extension of charge pumping time.

7. The method for efficiency improvement in charge pump systems of claim 6 wherein said extension of said charge pumping time results in a prevention of said leakage current.

8. The method for efficiency improvement in charge pump systems of claim 4 wherein said charge pump output power divided by a charge pump consumed power which results from said charge pumping action, is defined as a charge pump efficiency.

9. The method for efficiency improvement in charge pump systems of claim 7 wherein said prevention of said leakage current provides an optimized charge pump efficiency.

10. A method for efficiency improvement in charge pump systems comprising
the steps of:
providing a level detector which drives a charge pump and a ring oscillator,
providing a phase memory which drives said charge pump and which maintains said charge pump in a non-leakage phase or state, even when said charge pump has stopped, wherein said phase memory maintains said charge pump in said non-leakage phase until a new charge pump action begins,
providing said ring oscillator which drives said charge pump and said level detector,
providing said charge pump which drives said level detector, with a charge pumping action,
identifying a consumed current which occurs during said charge pumping action,
identifying a charge pump output voltage, VPP,
identifying leakage current which occurs during a charge pumping action, wherein said leakage current results in a leakage power,
providing a charge pump enable signal which activates charge pumping action,
providing a charge pump output voltage target which is detected by said level detector, and
providing a phase T2 cycle where a leakage current does not occur,
wherein said T2 cycle allows that additional circuitry beyond said level detector, said phase memory, said ring oscillator, and said charge pump is not required to minimize or eliminate said leakage current
wherein charge pump output power minus said leakage power divided by a charge pump consumed power results from said charge pumping action, is defined as a charge pump efficiency,
wherein said charge pump efficiency is varied and controlled by varying said charge pump output voltage target.

11. The method for efficiency improvement in charge pump systems of claim 10 wherein whenever said charge pump voltage goes above said charge pump target, said level detector stops said charge pump and said ring oscillator.

12. The method for efficiency improvement in charge pump systems of claim 10 wherein said phase T2 is maintained by said phase memory even after said charge pump enable signal is deactivated.

13. The method for efficiency improvement in charge pump systems of claim 12 wherein said phase T2 is maintained by said phase memory until said VPP voltage drops below said charge pump below voltage level target and a next charge pump action begins.

14. The method for efficiency improvement in charge pump systems of claim 13 wherein said phase T2 is maintained wherein there is a prevention of charge pump leakage during said phase T2, while said charge pumping is stopped after said charge pump enable signal is deactivated.

15. The method for efficiency improvement in charge pump systems of claim 14 wherein said charge pump output power divided by a charge pump consumed power which results from said charge pumping action, is defined as a charge pump efficiency.

16. The method for efficiency improvement in charge pump systems of claim 15 wherein said prevention of said charge pump leakage current provides an optimized charge pump efficiency.

17. An apparatus for efficiency improvement in charge pump systems for low power applications comprising:
a level detector which drives a charge pump and a ring oscillator,
said ring oscillator which drives said charge pump,
said charge pump which drives said level detector, with a charge pumping action,
leakage current which occurs during a charge pumping action, wherein said leakage current results in a leakage power,
a charge pump output voltage high target, a charge pump outlet voltage low target,
a charge pump enable signal which activates said charge pumping action, and
a charge pump output voltage,
wherein charge pump output power minus said leakage power divided by a charge pump consumed power results from said charge pumping action, is defined as a charge pump efficiency,
wherein said charge pump efficiency is varied and controlled by varying said charge pump output voltage high target,
wherein said charge pump efficiency is varied and controlled by varying said charge pump output voltage low target,
wherein changing said charge pump output voltage high target and said charge pump output voltage low target allows said charge pump to minimize a phase when said leakage current occurs.

18. The apparatus for efficiency improvement in charge pump systems of claim 17 wherein if said charge pump voltage goes below said charge pump output voltage low target, said charge pump enable signal activates.

19. The apparatus for efficiency improvement in charge pump systems of claim 17 wherein if said charge pump voltage goes above said charge pump output voltage high target, said charge pump enable signal deactivates.

20. An apparatus for efficiency improvement in charge pump systems for low power applications comprising:
a level detector which drives a charge pump and a ring oscillator,
said ring oscillator which drives said charge pump and said level detector,
said charge pump which drives said level detector, with a charge pumping action,
a consumed current which occurs during said charge pumping action,
a charge pump output voltage,
a leakage current which occurs during a charge pumping action, wherein said leakage current results in a leakage power,
a charge pump enable signal which activates charge pumping action,
a charge pump output voltage target which is detected by said level detector,
a phase T2 cycle where a leakage current does not occur,
a phase leakage current T1EF cycle wherein said leakage current does not occur, and
a phase leakage current partial T1EE1 cycle wherein said leakage current does not occur
wherein said leakage current is disabled during a protection time which includes entire charge pumping phases T2, T1EF, and partial T1EE1,
wherein said protection time allows that additional circuitry beyond said level detector, said ring oscillator, and said charge pump is not required to minimize or eliminate said leakage current
wherein charge pump output power minus said leakage power divided by a charge pump consumed power results from said charge pumping action, is defined as a charge pump efficiency,
wherein said charge pump efficiency is varied and controlled by varying said charge pump output voltage target.

21. The apparatus for efficiency improvement in charge pump systems of claim 20 wherein said charge pump enable signal remains active until said phase T2 cycle, said phase T1EF cycle and said phase partial T1EE1 cycle are completely executed, wherein said leakage current does not occur.

22. The apparatus for efficiency improvement in charge pump systems of claim 20 wherein said charge pump enable signal remains active causing an extension of charge pumping time.

23. The apparatus for efficiency improvement in charge pump systems of claim 22 wherein said extension of said charge pumping time results in a prevention of said leakage current.

24. The apparatus for efficiency improvement in charge pump systems of claim 20 wherein said charge pump output power divided by a charge pump consumed power which results from said charge pumping action, is defined as a charge pump efficiency.

25. The apparatus for efficiency improvement in charge pump systems of claim 23 wherein said prevention of said leakage current provides an optimized charge pump efficiency.

26. An apparatus for efficiency improvement in charge pump systems comprising the steps of:
a level detector which drives a charge pump and a ring oscillator,
a phase memory which drives said charge pump and which maintains said charge pump in a non-leakage phase or state, even when said charge pump has stopped, wherein said phase memory maintains said charge pump in said non-leakage phase until a new charge pump action begins,
said ring oscillator which drives said charge pump and said level detector,
said charge pump which drives said level detector, with a charge pumping action,
a consumed current which occurs during said charge pumping action,
a charge pump output voltage, VPP,
a leakage current which occurs during a charge pumping action,
wherein said leakage current results in a leakage power,
a charge pump enable signal which activates charge pumping action,
a charge pump output voltage target which is detected by said level detector, and
a phase T2 cycle where a leakage current does not occur,
wherein said T2 cycle allows that additional circuitry beyond said level detector, said phase memory, said ring oscillator, and said charge pump is not required to minimize or eliminate said leakage current,
wherein charge pump output power minus said leakage power divided by a charge pump consumed power results from said charge pumping action, is defined as a charge pump efficiency,
wherein said charge pump efficiency is varied and controlled by varying said charge pump output voltage target.

27. The apparatus for efficiency improvement in charge pump systems of claim 26 wherein whenever said charge pump voltage goes above said charge pump target, said level detector stops said charge pump and said ring oscillator.

28. The apparatus for efficiency improvement in charge pump systems of claim 26 wherein said phase T2 is maintained by said phase memory even after said charge pump enable signal is deactivated.

29. The apparatus for efficiency improvement in charge pump systems of claim 28 wherein said phase T2 is maintained by said phase memory until said VPP voltage drops below said charge pump below voltage level target and a next charge pump action begins.

30. The apparatus for efficiency improvement in charge pump systems of claim 29 wherein said phase T2 is maintained wherein there is a prevention of charge pump leakage during said phase T2, while said charge pumping is stopped after said charge pump enable signal is deactivated.

31. The apparatus for efficiency improvement in charge pump systems of claim 30 wherein said charge pump output power divided by a charge pump consumed power which results from said charge pumping action, is defined as a charge pump efficiency.

32. The apparatus for efficiency improvement in charge pump systems of claim 31 wherein said prevention of said charge pump leakage current provides an optimized charge pump efficiency.

* * * * *